United States Patent
Chang et al.

(10) Patent No.: US 11,254,107 B2
(45) Date of Patent: *Feb. 22, 2022

(54) ABRASION RESISTANT FLEXIBLE COMPOSITES AND MULTILAYER PIPE LINERS FOR CURED-IN-PLACE PIPE

(71) Applicant: Dow Global Technologies LLC, Midland, MI (US)

(72) Inventors: Dane Chang, Sugar Land, TX (US); Siddharth Ram Athreya, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/635,317

(22) PCT Filed: Sep. 12, 2018

(86) PCT No.: PCT/US2018/050700
§ 371 (c)(1),
(2) Date: Jan. 30, 2020

(87) PCT Pub. No.: WO2019/067217
PCT Pub. Date: Apr. 4, 2019

(65) Prior Publication Data
US 2020/0369009 A1    Nov. 26, 2020

Related U.S. Application Data

(60) Provisional application No. 62/563,876, filed on Sep. 27, 2017.

(51) Int. Cl.
| | | |
|---|---|---|
| F16L 55/165 | (2006.01) | |
| B32B 27/08 | (2006.01) | |
| B32B 1/08 | (2006.01) | |
| B32B 27/12 | (2006.01) | |
| B32B 27/32 | (2006.01) | |
| B32B 5/02 | (2006.01) | |
| C08L 23/06 | (2006.01) | |
| C08L 23/08 | (2006.01) | |

(52) U.S. Cl.
CPC ......... *B32B 27/08* (2013.01); *B32B 1/08* (2013.01); *B32B 5/022* (2013.01); *B32B 27/12* (2013.01); *B32B 27/32* (2013.01); *B32B 27/322* (2013.01); *C08L 23/06* (2013.01); *C08L 23/0815* (2013.01); *B32B 2250/02* (2013.01); *B32B 2260/021* (2013.01); *B32B 2260/046* (2013.01); *B32B 2270/00* (2013.01); *B32B 2274/00* (2013.01); *B32B 2307/30* (2013.01); *B32B 2307/546* (2013.01); *B32B 2307/72* (2013.01); *B32B 2323/04* (2013.01); *B32B 2597/00* (2013.01); *C08L 2205/025* (2013.01); *C08L 2205/035* (2013.01); *C08L 2207/04* (2013.01); *C08L 2207/068* (2013.01)

(58) Field of Classification Search
CPC .................................................. F16L 55/1656
See application file for complete search history.

(56) References Cited

U.S. PATENT DOCUMENTS

| | | |
|---|---|---|
| 3,645,992 A | 2/1972 | Elston |
| 5,206,075 A | 4/1993 | Hodgson, Jr. |
| 5,241,031 A | 8/1993 | Mehta |
| 5,272,236 A | 12/1993 | Lai et al. |
| 5,278,272 A | 1/1994 | Lai et al. |
| 5,539,021 A | 7/1996 | Pate et al. |
| 5,688,842 A | 11/1997 | Pate, III et al. |
| 5,756,659 A | 5/1998 | Hughes et al. |
| 6,455,636 B2 | 9/2002 | Sanada |
| 7,478,654 B2 | 1/2009 | Haines |
| 7,608,668 B2 | 10/2009 | Li Pi Shan et al. |
| 7,858,706 B2 | 12/2010 | Arriola et al. |
| 7,893,166 B2 | 2/2011 | Shan et al. |
| 7,947,793 B2 | 5/2011 | Marchand et al. |
| 8,063,128 B2 | 11/2011 | Moncla et al. |
| 8,785,554 B2 | 7/2014 | Li Pi Shan et al. |
| 10,844,203 B2 * | 11/2020 | Chang ................. C08L 23/0815 |
| 2005/0100754 A1 | 5/2005 | Moncla et al. |

(Continued)

FOREIGN PATENT DOCUMENTS

| | | |
|---|---|---|
| WO | 9003414 | 4/1990 |
| WO | 9303093 | 2/1993 |

(Continued)

OTHER PUBLICATIONS

Williams, "The Construction of a Polyethylene Calibration Curve for Gel Permeation Chromatography Using Polystyrene Fractions," Polymer Letters, 1968, p. 621-624, vol. 6.

(Continued)

*Primary Examiner* — Andrew T Piziali

(57) ABSTRACT

Embodiments of the present disclosure include composites and flexible multilayer pipe liners comprising a fibrous layer; and a polyolefin backing layer comprising a blend of: (a) an ultra-high molecular weight ethylene-based polymer having an intrinsic viscosity from 5 to 50 deciliters/gram, (b) a polyethylene resin comprising a first molecular weight ethylene-based polymer component and a second molecular weight ethylene-based polymer component, wherein the polyethylene resin has a density from 0.930 to 0.960 g/cc; (c) a thermoplastic polyolefin elastomer having a density of from 0.850 to 0.910 g/cc; and (d) optionally, a fluoropolymer.

20 Claims, No Drawings

(56) References Cited

U.S. PATENT DOCUMENTS

2006/0199930 A1 9/2006 Li Pi Shan et al.
2019/0161602 A1* 5/2019 Chang .................... C08L 23/06

FOREIGN PATENT DOCUMENTS

| WO | 2004101674 | | 11/2004 |
| WO | 2005090427 | A2 | 9/2005 |
| WO | 2015123187 | | 8/2015 |
| WO | 2017120016 | | 7/2017 |

OTHER PUBLICATIONS

PCT/US2018/050700 Search Report and Written Opinion dated Nov. 7, 2018.
PCT/US2018/050700 International Preliminary Report on Patentability dated Mar. 31, 2020.

* cited by examiner

ABRASION RESISTANT FLEXIBLE COMPOSITES AND MULTILAYER PIPE LINERS FOR CURED-IN-PLACE PIPE

TECHNICAL FIELD

Embodiments described herein relate generally to flexible composites and flexible multilayer pipe liners, and processes for forming flexible multilayer pipe liners. Such flexible multilayer pipe liners, flexible composites, and processes can be used in a cured-in-place pipe rehabilitation process for pipes requiring high abrasion resistance and thermal properties.

BACKGROUND

Underground sewer pipes, potable water pipes, and other pipes can fracture with use and age. Repair of these leaking and damaged pipes is time consuming and expensive as it often involves excavation and replacement of these damaged pipes.

One solution is to use cured-in-place pipe (CIPP) technology. CIPP can involve saturating a flexible non-woven felt liner with a curable thermoset composition, followed by inverting the saturated non-woven felt liner into an existing (host) pipe, and curing of the saturated felt liner within the host pipe by application of hot water, UV light, or steam. The CIPP process is classified as rehabilitation or renovation, because it forms a new jointless, seamless, and hard inner pipe within and adhering to the existing host pipe.

However, for existing pipes used to transport slurry or other abrasive particulate streams, the CIPP technology can be subjected to a high degree of wear. Current CIPP technologies may not be capable of transporting gritty water-based slurries, such as mining slurries, petroleum-based slurries, and/or solvent-based slurries. Existing pipes may also be subjected to high temperature applications, where the pipes transport high temperature materials and/or are subjected to environmental conditions that can cause pipes to have premature mechanical failures. Current CIPP technologies may not be adequate to transport such slurries or other abrasive particulate streams at elevated temperatures, such as, for example, above 60° C. (140° F.).

Accordingly, alternative CIPP technologies having good abrasive and thermal properties, as well as good processability, may be desired.

SUMMARY

In a first embodiment of the present disclosure, disclosed are flexible composites. The flexible composites comprise a fibrous layer; and a polyolefin backing layer comprising a blend of: (a) an ultra-high molecular weight ethylene-based polymer having an intrinsic viscosity from 5 to 50 deciliters/gram, (b) a polyethylene resin comprising a first molecular weight ethylene-based polymer component and a second molecular weight ethylene-based polymer component, wherein the polyethylene resin has a density from 0.930 to 0.960 g/cc; (c) a thermoplastic polyolefin elastomer having a density of from 0.850 to 0.910 g/cc; and (d) optionally, a fluoropolymer.

In a second embodiment, the ultra-high molecular weight ethylene-based polymer of the first embodiment has a density of from 0.915 to 0.950 g/cc. In a third embodiment, the ultra-high molecular weight ethylene-based polymer of the first or second embodiments has a weight average molecular weight of greater than 1,000,000 g/mole.

In a fourth embodiment, the polyethylene resin of the first—third embodiments has a melt index (I2) from 0.03-2.0 g/10 min. In a fifth embodiment, the polyethylene resin of the first—fourth embodiments has a high load melt index (I21) from 1 to 20 g/10 min.

In a sixth embodiment, the first molecular weight ethylene-based polymer component of the first—fifth embodiments has a density of from 0.910 to 0.940 g/cc. In a seventh embodiment, the first molecular weight ethylene-based polymer component of the first—sixth embodiments has a high load melt index (I21) of from 0.05 to 1.2 g/10 min.

In an eighth embodiment, the blend of the first—seventh embodiments has a high load melt index (I21) from 0.1 to 40 g/10 min. In a ninth embodiment, the thermoplastic polyolefin elastomer of the first—eighth embodiments is selected from the group consisting of ethylene/alpha-olefin interpolymers, ethylene/alpha-olefin multi-block interpolymers, and combinations thereof. In a tenth embodiment, the blend of the first—eighth embodiments further comprises a fluoropolymer that has a melt flow index (265° C.; 5.0 kg) from 2.0 to 20.0 g/10 min. In an eleventh embodiment, the blend of the first—tenth embodiments comprises a fluoropolymer that is present in an amount from 50 to 5000 ppm, based on the weight of the blend.

In a twelfth embodiment of the present disclosure, disclosed are flexible multilayer pipe liners. The flexible multilayer pipe liners comprise a fibrous layer saturated with a resin or resin dispersion; and a polyolefin backing layer comprising a blend of (a) an ultra-high molecular weight ethylene-based polymer having an intrinsic viscosity from 5 to 50 deciliters/gram, (b) a polyethylene resin comprising a first molecular weight ethylene-based polymer component and a second molecular weight ethylene-based polymer component, wherein the polyethylene resin has a density from 0.930 to 0.960 g/cc; (c) a thermoplastic polyolefin elastomer having a density of from 0.850 to 0.910 g/cc; and (d) optionally, a fluoropolymer.

In a thirteenth embodiment, the ultra-high molecular weight ethylene-based polymer of the twelfth embodiment has a density of from 0.915 to 0.950 g/cc. In a fourteenth embodiment, the ultra-high molecular weight ethylene-based polymer of the twelfth or thirteenth embodiments has a weight average molecular weight of greater than 1,000,000 g/mole.

In a fifteenth embodiment, the polyethylene resin of the twelfth—fourteenth embodiments has a melt index (I2) from 0.03-2.0 g/10 min. In a sixteenth embodiment, the polyethylene resin of the twelfth—fifteenth embodiments has a high load melt index (I21) from 1 to 20 g/10 min.

In a seventeenth embodiment, the first molecular weight ethylene-based polymer component of the twelfth—sixteenth embodiments has a density of from 0.910 to 0.940 g/cc. In a eighteenth embodiment, the first molecular weight ethylene-based polymer component of the twelfth—seventeenth embodiments has a high load melt index (I21) of from 0.05 to 1.2 g/10 min.

In a nineteenth embodiment, the blend of the twelfth—eighteenth embodiments has a high load melt index (I21) from 0.1 to 40 g/10 min. In a twentieth embodiment, the thermoplastic polyolefin elastomer of the twelfth—nineteenth embodiments is selected from the group consisting of ethylene/alpha-olefin interpolymers, ethylene/alpha-olefin multi-block interpolymers, and combinations thereof. In a twenty-first embodiment, the blend of the twelfth—twentieth embodiments further comprises a fluoropolymer that has a melt flow index (265° C.; 5.0 kg) from 2.0 to 20.0 g/10 min. In a twenty-second embodiment, the blend of the twelfth—twenty-first embodiments comprises a fluoropolymer that is present in an amount from 50 to 5000 ppm, based on the weight of the blend.

In a twenty-third embodiments, the resin of the twelfth—twenty-second embodiments is a polyester, vinyl ester, epoxy, carbamide, or combinations thereof. In a twenty-fourth embodiments, the resin dispersion of the twelfth—twenty-third embodiments is an aqueous polyolefin dispersion comprising: (a) a base resin comprising at least one $C_2$-$C_3$ polyolefin having a melting point of at least 110° C.; and (b) a dispersing agent comprising at least one polymer having ethylene and carboxylic acid, a modifying polymer comprising at least one maleated $C_2$-$C_3$ polyolefin wax, or combinations thereof. In a twenty-fifth embodiment, the flexible multilayer pipe liner of the twelfth—twenty-fourth embodiments is used to form a cured-in-place pipe liner.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of the instantly-disclosed flexible composites, flexible multilayer pipe liners, and processes for forming flexible multilayer pipe liners. The flexible composites, flexible multilayer pipe liners, and processes, are suitable for use in CIPP applications. It is noted, however, that this is merely an illustrative implementation of the embodiments disclosed herein. The embodiments are applicable to other technologies that are susceptible to similar problems as those discussed above. For example, the composites or liners described herein may be used in pipe coatings, drip irrigation tape and tubing, films, sheets, tapes, fibers, caps and closures, and molded articles by molding processes, including blow molding, compression molding, and injection molding (for example, the injection molding of pipe fittings), all of which are within the purview of the present embodiments. The composites or liners may be stitched in cylindrical form (the shape of the host pipe) and is made to fit snugly in the host pipe. The diameter of the composite or liner in cylindrical form can range from about 3 inches to about 100 inches.

In embodiments herein, a flexible composite or flexible multilayer pipe liner is provided. The flexible composite or flexible multilayer pipe liner comprises a fibrous layer and a polyolefin backing layer. As used herein, the term "flexible" as it relates to pipe liners means it has a flexural modulus of less than 15,000 psi as determined by ASTM D790 (compression molded sample, Procedure A and sample thickness 30 mils), and is suitable for the invert installation required for the CIPP process. As used herein, the term "polyolefin" refers to a polymer which comprises greater than 50 wt. % units derived from one or more olefinic monomers, for example, ethylene or propylene (based on weight of the polymer) and, optionally, may contain at least one comonomer. Examples include polyethylene having greater than 50 wt. % units derived from ethylene monomer (e.g., high density polyethylene (HDPE), medium density polyethylene (MDPE), low density polyethylene (LDPE), linear low density polyethylene (LLDPE), and olefin block copolymer (OBC)); polypropylene having greater than 50 wt. % units derived from propylene monomer, or polybutylene having greater than 50 wt. % units derived from butylene monomer, etc.

Fibrous Layer

The fibrous layer is a material that may be saturated with a resin or resin dispersion. The desirable degree or amount of saturation can range from a partial saturation of the fibrous structure to a complete saturation of the fibrous structure. The desired degree of saturation can depend upon variables including the nature of the fiber being saturated and the nature of the saturated material. The intended end properties of the saturated structure will influence the selection of the specific ingredients and processing parameters.

Examples of fibrous layers include nonwoven felt, fiber glass reinforced nonwoven felt, or glass fiber. The fibrous layer may also include: short fibers, long fibers, nonwoven fibers, woven fibers, or any combination thereof. The fibrous layer may be unidirectional fibers. The fibrous layer may be oriented in a plurality of directions. For example, one fiber may be oriented in a first direction and a second fiber may be oriented in a second direction having a predetermined angle from the first direction. The fibrous layer may be randomly oriented in two or more dimensions. For example, the fibrous layer may have randomly oriented short fibers. The fibrous layer may include natural or synthetic fibers. In some embodiments, the fibrous layer is a felt. In other embodiments, the fibrous layer is a nonwoven felt or a fiber glass reinforced nonwoven felt. Examples of materials that can be used in the fibrous layer include glass, carbon, graphite, polyaramid, nylon, polyester, polypropylene, polyethylene. Natural materials include flax, hemp, jute, ramie, kenaf, coir, bamboo, agave, sisal, cotton, abaca, manila hemp, and henequen. The fibrous layer may have a thickness generally in the range of from about 3 mm to about 25 mm.

In embodiments herein, the resins may be plastic resins that are reactive to hot water, UV light, or steam curing. Examples of resins that may be used to saturate the fibrous layer include polyester or unsaturated polyester resins, vinyl ester resins, epoxy resins, carbamide resins, or combinations thereof. The resin dispersion may be an aqueous polyolefin dispersion. In some embodiments, the aqueous polyolefin dispersion comprises (a) a base resin comprising at least one $C_2$-$C_3$ polyolefin having a melting point of at least 110° C., and (b) a dispersing agent comprising at least one polymer having ethylene and carboxylic acid, a modifying polymer comprising at least one maleated $C_2$-$C_3$ polyolefin wax, or combinations thereof.

The at least one $C_2$-$C_3$ polyolefin can include polyolefins such as polypropylene, polyethylene, copolymers thereof, and blends thereof, as well as ethylene-propylene-diene terpolymers, may be used. In some embodiments, exemplary $C_2$-$C_3$ polyolefin include homogeneous polymers; high density polyethylene (HDPE); medium density polyethylene (MDPE); heterogeneously branched linear low density polyethylene (LLDPE); heterogeneously branched ultra-low density polyethylene (ULDPE); olefin block copolymer (OBC); homogeneously branched, linear ethylene/alpha-olefin copolymers; homogeneously branched, substantially linear ethylene/alpha-olefin polymers; and high pressure, free radical polymerized ethylene polymers and copolymers such as low density polyethylene (LDPE) or ethylene vinyl acetate polymers (EVA). In some embodiments, the polyethylene copolymers have a density from above about 0.870 g/cm³. In other embodiments, the polyethylene copolymers have a density from about 0.930 g/cm³ to about 0.970 g/cm³. In certain embodiments, the base resin comprises polypropylene. Various commercially available $C_2$-$C_3$ polyolefins are contemplated for the aqueous dispersion. $C_2$-$C_3$ polyolefins suitable for use may include, by way of example and not limitation, HDPE DMDA 8940, HDPE DGDA 2490, MDPE DGDA 2420, all available from The Dow Chemical Company, Midland Mich., and 6D43 polypropylene, available from Braskem America, Inc. In some embodiments, the base resin may be included in an amount from about 60 weight % to about 90 weight % based on a weight of the aqueous dispersion. In other embodiments, the base resin may be included in an amount from about 65 weight % to about 85 weight % or from about 70 weight % to about 80 weight % based on a weight of the aqueous dispersion.

In embodiments herein, the stability of the aqueous dispersion may be enhanced by the addition of the dispersing agent. Various commercially available dispersing agents comprising at least one polymer having ethylene and carboxylic acid are contemplated for the aqueous dispersion. Dispersing agents comprising ethylene and carboxylic acid copolymers suitable for use may include, by way of example and not limitation, PRIMACOR™ 5980i, available from The Dow Chemical Company, Midland Mich., and UNI-CID™ 350, available from Barker Hughes Corporation. In some embodiments, the dispersing agent may be included in an amount from about 3 weight % to about 30 weight % based on a weight of the aqueous dispersion. In other embodiments, the dispersing agent may be included in an amount from about 5 weight % to about 25 weight % or from about 10 weight % to about 20 weight % based on a weight of the aqueous dispersion. In certain embodiments, PRIMACOR™ 5980i may be included in an amount from about 10 weight % to about 30 weight % based on a weight of the aqueous dispersion, while UNICID™ 350 may be included in an amount from about 3 weight % to about 8 weight % based on total weight of the aqueous dispersion.

In embodiments herein, the mechanical properties of the aqueous dispersion may be improved by the addition of a modifying polymer. The modifying polymer may also improve dispersion of the base resin and improve adhesion of the aqueous dispersion to the fibrous layer. The modifying polymer comprising at least one maleated $C_2$-$C_3$ polyolefin wax can include polyolefins, such as, polypropylene, polyethylene, copolymers thereof, and blends thereof, as well as ethylene-propylene-diene terpolymers, may be used. In some embodiments, exemplary $C_2$-$C_3$ polyolefin include homogeneous polymers; high density polyethylene (HDPE); heterogeneously branched linear low density polyethylene (LLDPE); heterogeneously branched ultra-low linear density polyethylene (ULDPE); homogeneously branched, linear ethylene/alpha-olefin copolymers; homogeneously branched, substantially linear ethylene/alpha-olefin polymers; and high pressure, free radical polymerized ethylene polymers and copolymers such as low density polyethylene (LDPE) or ethylene vinyl acetate polymers (EVA). Various commercially available modifying polymers comprising at least one maleated $C_2$-$C_3$ polyolefin wax are contemplated for the aqueous dispersion. Maleated $C_2$-$C_3$ polyolefin wax suitable for use may include, by way of example and not limitation, AMPLIFY™ GR204 (available from The Dow Chemical Company, Midland Mich.), LICOCENE™ PE MA 4351, LICOCENE™ 6452 (both available from Clariant), and Honeywell AC575 (available from Honeywell Performance Materials and Technologies). In some embodiments, the modifying polymer may be included in an amount from about 0 weight % to about 30 weight % based on a weight of the aqueous dispersion. In other embodiments, the modifying polymer may be included in an amount from about 5 weight % to about 25 weight % or from about 10 weight % to about 20 weight % based on a weight of the aqueous dispersion.

The aqueous dispersion may be made by any convenient method suitable for providing an aqueous dispersion of particles having one or more features according to the instant disclosure. Preferred processes result in dispersion particles that are sufficiently small so that they can flow enter and/or flow through the spaces formed between the fibers of the fibrous layer, such as non-woven felt, fiber glass reinforced non-woven felt, or glass fiber typically used in the CIPP process. For example, the base resin, and modifying polymer and/or dispersing agent can be melt-kneaded in an extruder along with water and a neutralizing agent, such as dimethyethanolamine (DMEA) to form a dispersion compound. In certain embodiments, other neutralizing agents such as KOH, NaOH, and other fugitive bases such as ammonia and 2-amino-2-methyll-propanol (AMP) may be used.

Any melt-kneading means known in the art may be used. In some embodiments, a kneader, a BANBURY® mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. Nos. 5,756,659 and 6,455,636. The aqueous dispersion may also be prepared using one or any combination of steps described in U.S. Pat. Nos. 5,539,021, 5,688,842, and 8,063,128, and US2005/0100754A1.

In some embodiments, a polyolefin dispersion or dispersion compound may be applied to a fibrous structure using any application method known to those skilled in the art. In other embodiments, a fibrous structure may be saturated with a polyolefin dispersion or dispersion compound. Advantageously, the aqueous dispersions formed in accordance with the embodiments disclosed herein provide the ability to apply the aqueous dispersion to or to saturate the dispersion into fibers of the fibrous layer, such as non-woven felt, fiber glass reinforced non-woven felt, or glass fiber typically used in the CIPP process. The aqueous dispersion achieves good adhesive properties, and allows for the formation of a flexible multilayer pipe liner upon drying.

The aqueous dispersion includes a sufficient amount of the water so that the dispersion can flow. The flow characteristics of the aqueous dispersion can be controlled by adjusting the water concentration. The concentration of the water in the aqueous dispersion may vary from about 30 weight percent, to about 60 weight percent or more, based on the total weight of the aqueous dispersion. The concentration of the water in the aqueous dispersion can be sufficiently low so that the aqueous dispersion can be easily dried in one or more drying steps, such as a drying step that employs an elevated temperature (e.g., a temperature of about 35° C. or more), that employs a reduce pressure (e.g., a pressure of about 0.5 atmospheres or less), or both. The concentration of the water in the aqueous dispersion may be about 85 weight percent or less, about 75 weight percent or less about 65 weight percent or less, about 55 weight percent or less, about 50 weight percent or less, or about 45 weight percent or less, based on the total weight of the aqueous dispersion. Aqueous dispersions having a concentration of water of about 45 weight percent or less allow for reduced drying times, and/or reduced energy costs of drying.

The aqueous dispersion may include a total solids content (base resin, and dispersing agent and/or modifying polymer) from about 40 weight percent to about 65 weight percent or more, based on the total weight of the aqueous dispersion. The concentration of the total solids content in the aqueous dispersion may be about 85 weight percent or less, about 75 weight percent or less, about 65 weight percent or less, about 55 weight percent or less, about 50 weight percent or less, or about 45 weight percent or less, based on the total weight of the aqueous dispersion. The concentration of the total solids content in the aqueous dispersion may be about 10 weight percent or more, about 25 weight percent or more, or about 45 weight percent or more, based on the total weight of the aqueous dispersion. The total solids content of the aqueous dispersion should be as high as possible while still providing the necessary viscosity needed to form the flexible multilayer pipe liner. The aqueous dispersions have a sufficiently low viscosity so that they can flow into architecture of fibers of the fibrous layer, but a sufficiently high amount of solids so that the particles are not too dispersed once the water and neutralizing agent (if present) are removed by drying. For example, the dispersion can have a viscosity (at 25° C.) of less than about 1,000 cps.

The fibrous layer is dried to remove some or all of the water as well as the neutralizing agent (if present). For example, the wet fibrous layer may be dried by heating the wet fibrous layer, by air-drying the wet fibrous layer, by flowing a dry purge gas over the wet fibrous layer, by placing the fibrous wet layer in a desiccator or other low humidity environment, by using a vacuum, or any combination thereof, in order to form a fibrous layer. In certain embodiments, the drying step results in substantially none of the base resin being removed, substantially none of the dispersing agent and/or modifying polymer is removed, or any combination thereof.

The drying step(s) may remove excess water and/or the neutralizing agent. In certain embodiments, the drying step(s) removes substantially all of the water in the fibrous layer with the applied aqueous dispersion. For example, the drying step(s) may reduce the amount of water to about 2 weight percent or less, about 1 weight percent or less, about 0.5 weight percent or less, about 0.2 weight percent or less, and about 0.1 weight percent or less. In some embodiments, the flexible multilayer pipe liner is about 100% solids.

Polyolefin Backing Layer

The polyolefin backing layer comprises a blend of ultra-high molecular weight ethylene-based polymer, polyethylene resin, thermoplastic polyolefin elastomer, and, optionally, a fluoropolymer. The blend can be obtained by dry or melt mixing the already produced components, through in-situ production by in parallel and/or in series arranged reactors, or a combination thereof. For example, in some embodiments, the ultra-high molecular weight ethylene-based polymer and the polyethylene resin may be blended in-situ, and then blended by dry or melt mixing with the thermoplastic polyolefin elastomer. In other embodiments, all components are blended by dry or melt mixing. In further embodiments, the polyethylene resin and the thermoplastic polyolefin elastomer may be blended in-situ, and then blended by dry or melt mixing with the ultra-high molecular weight ethylene-based polymer.

The blends described herein may comprise from 30 to 60 wt. % of the ultra-high molecular weight ethylene-based polymer. All individual values and subranges of 30 to 60 wt. % are included and disclosed herein. For example, the blend may comprise from a lower limit of 30, 35, 40, 45, or 50 wt. % to an upper limit of 60, 55, 50, 45, or 40 wt. % of the ultra-high molecular weight ethylene-based polymer. In some embodiments, the blend comprises from 30 to 55 wt. %, 35 to 55 wt. %, or 35 to 50 wt. % of the ultra-high molecular weight ethylene-based polymer. In addition to the amount of ultra-high molecular weight ethylene-based polymer, the blends may further comprise from 10-40 wt. % of the polyethylene resin. All individual values and subranges of 10-40 wt. % are included and disclosed herein. For example, the blend may comprise from a lower limit of 10, 15, 20, 25, 30, or 35 wt. % to an upper limit of 40, 35, 30, 25, 20 wt. % of the polyethylene resin. In some embodiments, the blend comprises from 10 to 35 wt. %, 15 to 35 wt. %, or 15 to 30 wt. % of the polyethylene resin. In addition to the amounts of ultra-high molecular weight ethylene-based polymer and polyethylene resin, the blends may further comprise from 10 to 40 wt. % of the thermoplastic polyolefin elastomer. All individual values and subranges of 10-40 wt. % are included and disclosed herein. For example, the blend may comprise from a lower limit of 10, 15, 18, 20, 25, 30, or 35 wt. % to an upper limit of 40, 35, 30, 25, 20 wt. % of the thermoplastic polyolefin elastomer. In some embodiments, the blend comprises from 15 to 40 wt. %, 18 to 40 wt. %, or 18 to 35 wt. % of the thermoplastic polyolefin elastomer. The amounts of ultra-high molecular weight ethylene-based polymer, polyethylene resin, and thermoplastic polyolefin elastomer may add up to 100 wt. %, which does not include minor amounts (10 wt. % or less) of additives.

Ultra-High Molecular Weight Ethylene-Based Polymer

The ultra-high molecular weight ethylene-based polymers described herein may be a polyethylene homopolymer or ethylene/alpha-olefin copolymer, each having an ultra-high molecular weight. The ultra-high molecular weight ethylene-based polymer has a higher molecular weight than the first molecular weight ethylene-based polymer component, second molecular weight ethylene-based polymer component, and/or the polyethylene resin as further described herein. This may be indicated by melt index ($I_2$), high load melt index ($I_{21}$), a viscosity measurement (e.g., intrinsic or melt viscosity), and/or GPC. Suitable copolymers may include alpha-olefins having 3 to 10 carbon atoms or, in some embodiments, 3 to 5 carbon atoms. In some embodiments, the ethylene/alpha-olefin copolymer may comprise up to about 5 mol. % of the alpha-olefin comonomer, up to about 2 mol. %. of the alpha-olefin comonomer, or up to about 1 mol. % of the alpha-olefin comonomer. Suitable ultra-high molecular weight ethylene-based polymers may include, but is not limited to, the GUR® 4120, 4130, 4150 or 4170 polymer available from Ticona Engineering Polymers, and the UTEC® 6540 or 6541 polymers available from Braskem.

In embodiments herein, the ultra-high molecular weight ethylene-based polymer has an intrinsic viscosity of from 5 to 50 deciliters/gram. All individual values and subranges of from 5 to 50 deciliters/gram are disclosed and included herein. For example, the ultra-high molecular weight ethylene-based polymer may have an intrinsic viscosity ranging from a lower limit of 5, 7, 10, 12, 15, or 20 deciliters/gram to an upper limit of 50, 45, 40, 35, 30, or 25 deciliters/gram. In some embodiments, the ultra-high molecular weight ethylene-based polymer has an intrinsic viscosity of from 5 to 50 deciliters/gram, 5 to 40 deciliters/gram, 7 to 40 deciliters/gram, or 10 to 30 deciliters/gram. The intrinsic viscosity may be determined in accordance with ASTM D 4020.

In embodiments herein, the ultra-high molecular weight ethylene-based polymer has an average particle size, D50, from 100-220 micrometers. All values and subranges are included herein. For example, in some embodiments, the ultra-high molecular weight ethylene-based polymer has an average particle size, D50, from 180-220 micrometers. In other embodiments, the ultra-high molecular weight ethylene-based polymer has an average particle size, D50, from 120-140 micrometers. The average particle size may be determined in accordance with ASTM D 1921.

In embodiments herein, the ultra-high molecular weight ethylene-based polymer has a melt temperature from 125 to 160° C. All values and subranges are included herein. For example, in some embodiments, the ultra-high molecular weight ethylene-based polymer has a melt temperature from 125 to 160° C. In other embodiments, the ultra-high molecular weight ethylene-based polymer has a melt temperature from 128 to 138° C. In further embodiments, the ultra-high molecular weight ethylene-based polymer has a melt temperature of 130 to 135° C. The melt temperature may be determined using differential scanning calorimetry (DSC) in accordance with ASTM D3418.

In embodiments herein, the ultra-high molecular weight ethylene-based polymer may have a weight average molecular weight greater than or equal to 1,000,000 g/mole. In some embodiments, the ultra-high molecular weight ethylene-based polymer may have a weight average molecular weight greater than or equal to 2,000,000 or greater than or equal to 3,000,000 g/mole. In other embodiments, the ultra-high molecular weight ethylene-based polymer may have a weight average molecular weight greater than or equal to 1,000,000 g/mole and less than or equal to 10,000,000 g/mole, greater than or equal to 2,000,000 g/mole and less than or equal to 10,000,000 g/mole, greater than or equal to 3,000,000 g/mole and less than or equal to 9,000,000 g/mole, or greater than or equal to 3,000,000 g/mole and less than or equal to 8,000,000 g/mole. The weight average molecular weight may be determined by GPC or light scattering.

In embodiments herein, the ultra-high molecular weight ethylene-based polymer may have a density from 0.905 to 0.950 g/cc. All values and subranges are included herein. For example, in some embodiments, the ultra-high molecular weight ethylene-based polymer may have a density from 0.910 to 0.945 g/cc, from 0.920 to 0.940 g/cc, from 0.920 to 0.935 g/cc, from 0.920 to 0.930 g/cc, or from 0.921 to 0.928 g/cc. The density may be determined in accordance with ASTM D792.

Polyethylene Resin

The polyethylene resin comprises a first molecular weight ethylene-based polymer component and a second molecular weight ethylene-based polymer component. As used herein, "ethylene-based polymer" refers to a polymer that comprises, in polymerized form, a majority weight percent ethylene (based on the total amount of polymerizable monomers), and, optionally, one or more additional comonomers different from ethylene. For example, when the ethylene-based polymer is a copolymer, the amount of ethylene is greater than 50 wt. %, based on the total weight of the copolymer. The polyethylene resin may comprise a combination of two or more embodiments as described herein.

In embodiments herein, the first molecular weight ethylene-based polymer component of the polyethylene resin may be an ethylene-based interpolymer, ethylene/α-olefin interpolymer, homogeneously branched ethylene-based interpolymer or copolymer, or a heterogeneously branched ethylene-based interpolymer or copolymer. Homogeneously branched interpolymers may be produced, for example, by single-site catalyst systems, and contain a substantially homogeneous distribution of comonomer among the molecules of the interpolymer. Heterogeneously branched interpolymers may typically be produced by Ziegler-Natta type catalysts, and contain a non-homogeneous distribution of comonomer among the molecules of the interpolymer. The comonomer may be an α-olefin. In some embodiments, the first molecular weight ethylene-based polymer component is an ethylene/α-olefin interpolymer, and further an ethylene/α-olefin copolymer. In other embodiments, the first molecular weight ethylene-based polymer component is an ethylene/1-hexene copolymer. Trace amounts of impurities, for example, catalyst residues, may be incorporated into and/or within a polymer.

As used herein, "interpolymer" refers to polymers prepared by the polymerization of at least two different types of monomers. The term "interpolymer" can include copolymers, which is used to refer to polymers prepared from two different types of monomers, and polymers prepared from more than two different types of monomers. As used herein, the term "ethylene-based interpolymer" refers to an interpolymer that comprises, in polymerized form, a majority weight percent ethylene (based on the weight of interpolymer), and one or more additional comonomers. The term "ethylene/α-olefin interpolymer" refers to an ethylene-based polymer that comprises, in polymerized form, a majority weight percent ethylene (based on the weight of interpolymer), an α-olefin comonomer, and optionally, one or more additional comonomers.

Suitable α-olefins may include those containing 3 to 20 carbon atoms (C3-C20). In some embodiments, the α-olefin may be a C4-C20 α-olefin, a C4-C12 α-olefin, a C3-C10 α-olefin, a C3-C8 α-olefin, a C4-C8 α-olefin, or a C6-C8 α-olefin. In some embodiments, α-olefins are selected from the group consisting of propylene, 1-butene, 1-pentene, 1-hexene, 4-methyl-1-pentene, 1-heptene, 1-octene, 1-nonene and 1-decene. In other embodiments, α-olefins are selected from the group consisting of propylene, 1-butene, 1-hexene, and 1-octene. In further embodiments, α-olefins are selected from the group consisting of 1-hexene and 1-octene. In even further embodiments, the α-olefin is 1-hexene.

Exemplary ethylene/α-olefin interpolymers may include, but are not limited to, ethylene/butene-1 (EB) copolymers, ethylene/hexene-1 (EH) copolymers, ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. In some embodiments, the ethylene/α-olefin interpolymers are selected from the group consisting of EB, EH and EO copolymers. In other embodiments, the ethylene/α-olefin interpolymers are selected from the group consisting of EH and EO copolymers. In further embodiments, the ethylene/α-olefin interpolymer is EH.

In embodiments herein, the density of the first molecular weight ethylene-based polymer component is from 0.910 to 0.940 g/cc. All individual values and subranges of 0.910 to 0.940 g/cc are included and disclosed herein. For example, in some embodiments, the density of the first molecular weight ethylene-based polymer component is from 0.915 to 0.940 g/cc. In other embodiments, the density of the first molecular weight ethylene-based polymer component is from 0.920 to 0.940 g/cc. In further embodiments, the density of the first molecular weight ethylene-based polymer component is from 0.920 to 0.935 g/cc. Densities disclosed herein for ethylene-based polymers are determined according to ASTM D-792.

In embodiments herein, the first molecular weight ethylene-based polymer component has a weight average molecular weight (Mw) of greater than 50,000 g/mole to less than or equal to 450,000 g/mole. All individual values and subranges of greater than 50,000 g/mole to less than or equal to 450,000 g/mole are included and disclosed herein. For example, in some embodiments, the first molecular weight ethylene-based polymer component may have a weight average molecular weight (Mw) of greater than or equal to 100,000 g/mole to less than or equal to 400,000 g/mole. In other embodiments, the first molecular weight ethylene-based polymer component may have a weight average molecular weight (Mw) of greater than 200,000 g/mole to less than or equal to 400,000 g/mole. In further embodiments, the first molecular weight ethylene-based polymer component may have a weight average molecular weight (Mw) of greater than 300,000 g/mole to less than or equal to 400,000 g/mole. The molecular weight may be determined by either Gel Permeation Chromatography (GPC) or light scattering according to the Standard Test Method ASTM D-4001-93 (1999).

In embodiments herein, the first molecular weight ethylene-based polymer component has a molecular weight distribution (MWD) of 4.0 to 8.0. All individual values and subranges of 4.0 to 8.0 are included and disclosed herein. For example, in some embodiments, the first molecular weight ethylene-based polymer component may have a MWD of 4.5 to 7.5, 4.5 to 6.5, or 4.8 to 6.0. As used herein, MWD refers to the ratio of weight average molecular weight (Mw) to number average molecular weight (Mn), that is, (Mw/Mn). The MWD may be determined by gel permeation chromatography (GPC), as discussed above.

In embodiments herein, the first molecular weight ethylene-based polymer component differs from the second molecular weight ethylene-based polymer component in one or more properties, such as, for example, melt index ($I_2$), high load melt index ($I_{21}$), density, number average molecular weight (Mn), weight average molecular weight (Mw), and/or MWD. In some embodiments, the first molecular weight ethylene-based polymer component may have a significantly higher weight average molecular weight than the second molecular weight ethylene-based polymer component. The difference in the weight average molecular weights is reflected in the melt indices. Accordingly, the high load melt index, $I_{21}$ (190° C., 21.6 kg weight) of the first molecular ethylene-based polymer is 0.05 to 1.2 g/10 min. All individual values and subranges of 0.05 to 1.2 g/10 min are included and disclosed herein. For example, in some embodiments, the high load melt index, $I_{21}$ of the first molecular ethylene-based polymer is 0.10 to 1.0 g/10 min. In other embodiments, the high load melt index, $I_{21}$ of the first molecular ethylene-based polymer is 0.10 to 0.80 g/10 min. In further embodiments, the high load melt index, $I_{21}$ of the first molecular ethylene-based polymer is 0.20 to 0.60 g/10 min.

In embodiments herein, the second molecular weight ethylene-based polymer component may be an ethylene homopolymer, an ethylene-based interpolymer, ethylene-based copolymer, ethylene/α-olefin interpolymer, or a heterogeneously branched ethylene-based interpolymer or copolymer. The comonomer may be an α-olefin as described herein. In some embodiments, the second molecular weight ethylene-based polymer component is an ethylene-based interpolymer. In other embodiments, the second molecular weight ethylene-based polymer component is ethylene/1-hexene copolymer. In other embodiments, the second molecular weight ethylene-based polymer component is a polyethylene homopolymer. In further embodiments, the second molecular weight ethylene-based polymer component is a mixture of a polyethylene homopolymer and an ethylene/α-olefin interpolymer.

The second molecular weight ethylene-based polymer component may have a weight average molecular weight (Mw) of less than 50,000 g/mole. All individual values and subranges of less than 50,000 g/mole are included and disclosed herein. For example, in some embodiments, the second molecular weight ethylene-based polymer component may have a weight average molecular weight (Mw) of less than or equal to 45,000 g/mole or less than or equal to 40,000 g/mole. In other embodiments, the second molecular weight ethylene-based polymer component may have a weight average molecular weight (Mw) of greater than or equal to 1,000 g/mole, greater than or equal to 10,000 g/mole, or greater than or equal to 15,000 g/mole to less than or equal to 50,000 g/mole, less than or equal to 45,000 g/mole, or less than or equal to 40,000 g/mole.

In embodiments herein, the density of the second molecular weight ethylene-based polymer component is from 0.950 to 0.990 g/cc. All individual values and subranges of 0.950 to 0.990 g/cc are included and disclosed herein. For example, in some embodiments, the density of the second molecular weight ethylene-based polymer component is from 0.955 to 0.985 g/cc. In other embodiments, the density of the second molecular weight ethylene-based polymer component is from 0.960 to 0.980 g/cc. In further embodiments, the density of the second molecular weight ethylene-based polymer component is from 0.965 to 0.978 g/cc. The density of the second molecular weight ethylene-based polymer component may be determined from the following equation:

$$\frac{1}{\text{Density } (PE)} = \frac{\text{Weight Fraction } (A)}{\text{Density } (A)} + \frac{\text{Weight Fraction } (B)}{\text{Density } (B)} \quad (I)$$

wherein "A" is the first molecular weight ethylene-based polymer component, "B" is the second molecular weight ethylene-based polymer component, and "PE" is the polyethylene resin.

In embodiments herein, the polyethylene resin has a density from 0.930 g/cc to 0.960 g/cc. All individual values and subranges of from 0.930 g/cc to 0.960 g/cc are included and disclosed herein. For example, the polyethylene resin may have a density ranging from a lower limit of 0.930, 0.935, 0.940, or 0.945 g/cc to an upper limit of 0.960, 0.955, 0.950, or 0.945 g/cc. In some embodiments, the polyethylene resin has a density of 0.935 to 0.960 g/cc, 0.940 to 0.960 g/cc, 0.945 to 0.960 g/cc, 0.945 to 0.955 g/cc, or 0.945 to 0.950 g/cc.

In embodiments herein, the polyethylene resin has a melt index (I2) of from 0.03 to 2.0 g/10 min. All individual values and subranges of 0.03 to 2.0 g/10 min are included and disclosed herein. For example, the polyethylene resin may have a melt index (I2) ranging from a lower limit of 0.03, 0.04, 0.05, 0.07, 0.10, 0.15, or 0.20 g/10 min to an upper limit of 2.0, 1.8, 1.5, 1.2, 1.0, 0.9, 0.8, or 0.5 g/10 min. In some embodiments, the polyethylene resin has a melt index (I2) from 0.03 to 2.0 g/10 min, from 0.03 to 1.8 g/10 min, from 0.03 to 1.5 g/10 min, or from 0.05 to 1.0 g/10 min.

In embodiments herein, the polyethylene resin has a high load melt index (I21) of from 1 to 20 g/10 min. All individual values and subranges of 1 to 20 g/10 min are included and disclosed herein. For example, the polyethylene resin may have a high load melt index (I21) ranging from a lower limit of 1, 2, 3, 4, 5, 7, 10, 12, or 15 g/10 min to an upper limit of 20, 18, 15, 12, 10, 8, or 5 g/10 min. In some embodiments, the polyethylene resin has a high load melt index (I21) from 1 to 20 g/10 min, from 2 to 15 g/10 min, from 3 to 12 g/10 min, or from 4 to 10 g/10 min.

In embodiments herein, the polyethylene resin has a MWD of 5 to 30. All individual values and subranges of 5 to 30 are included and disclosed herein. For example, in some embodiments, the polyethylene resin may have a MWD of 8 to 27. As used herein, MWD refers to the ratio of weight average molecular weight (Mw) to number average molecular weight (Mn), that is, (Mw/Mn). The MWD may be determined by gel permeation chromatography (GPC).

The polyethylene resin may comprise any amount of the first molecular weight ethylene-based polymer component or the second molecular weight ethylene-based polymer component. In some embodiments, either component can be present, independently, in amounts of 0.5% to 99.5%, by weight of the polyethylene resin. All individual values and subranges of 0.5% to 99.5% are included and disclosed herein. For example, in some embodiments, the polyethylene resin comprises 30% to 70%, by weight of the polyethylene resin, 35% to 65%, by weight of the polyethylene resin, or 40% to 60%, by weight of the polyethylene resin, of the first molecular weight ethylene-based polymer component. In other embodiments, the polyethylene resin comprises 30% to 70%, by weight of the polyethylene resin, 35% to 65%, by weight of the polyethylene resin, or 40% to 60%, by weight of the polyethylene resin, of the second molecular weight ethylene-based polymer component. In further embodiments, the weight ratio of the first molecular weight ethylene-based polymer component to the second molecular weight ethylene-based polymer is from 0.4 to 2.3. In even further embodiments, the weight ratio of the first molecular weight ethylene-based polymer component to the second molecular weight ethylene-based polymer is from 0.6 to 2.0. In even further embodiments, the weight ratio of the first molecular weight ethylene-based polymer component to the second molecular weight ethylene-based polymer is from 0.8 to 1.5.

In embodiments herein, the polyethylene resin can be made by a variety of methods. For example, it may be made by blending or mixing the first molecular weight ethylene-based polymer component and the second molecular weight ethylene-based polymer component together. Alternatively, the polyethylene resin may be made in a single reactor or a multiple reactor configuration, where the multiple reactors may be arranged in series or parallel, and where each polymerization takes place in solution, in slurry, or in the gas phase. In some embodiments, a dual reactor configuration is used where the polymer made in the first reactor can be either the first molecular weight ethylene-based polymer component or the second molecular weight ethylene-based polymer component. The polymer made in the second reactor may have a density and melt flow rate such that the overall density and melt flow rate of the polyethylene resin are met. In some embodiments, the first molecular weight ethylene-based polymer component is made in the first reactor, and the second molecular weight ethylene-based polymer component is made in the second reactor. Similar polymerization processes are described in, for example, WO 2004/101674A, which is incorporated herein by reference.

In some embodiments, the polyethylene resin is manufactured using at least one Ziegler-Natta catalyst system, either alone, or in combination with a single site catalyst. In other embodiments, the polyethylene resin is manufactured using multiple reactors in series with a Z-N catalyst being fed to either each reactor or to just the first reactor. In further embodiments, the Z-N catalyst system may be fed into one or two independently-controlled reactors configured sequentially, and operated in solution, slurry or gas phase. Sequential polymerization may be conducted such that fresh catalyst is injected into one reactor, and substantially little active catalyst is carried over from the first reactor into the second reactor. The resulting polyethylene resin may be characterized as comprising component polymers, each having distinct, unimodal molecular weight distributions. As used herein, "distinct," when used in reference to the molecular weight distribution of the first molecular weight ethylene-based polymer component and the second molecular weight ethylene-based polymer component means there are two corresponding molecular weight distributions in the resulting GPC curve of the polyethylene resin. As used herein, "unimodal," when used in reference to the molecular weight distribution of a component polymer of the polyethylene resin means the molecular weight distribution in a GPC curve of the component polymer does not substantially exhibit multiple component polymers.

Thermoplastic Polyolefin Elastomer

The thermoplastic polyolefin elastomer (TPE) is a polyolefin that (1) has the properties of an elastomer, i.e., the ability to be stretched beyond its original length and retract to substantially its original length when released, and (2) can be processed like a thermoplastic, i.e., to soften when exposed to heat and return to substantially its original condition when cooled to room temperature. In embodiments herein, the TPE has a density of from 0.850 to 0.910 g/cc. All individual values and subranges are included and disclosed herein. For example, the TPE may have a density ranging from a lower limit of 0.850, 0.852, 0.855, 0.860, 0.862, 0.865, 0.870, 0.875, or 0.880 g/cc to an upper limit of 0.910, 0.908, 0.905, 0.902, 0.900, 0.898, 0.895, 0.890, 0.885, or 0.880 g/cc. In some embodiments, the TPE has a density of from 0.852 to 0.910 g/cc, 0.855 to 0.900 g/cc, or 0.855 to 0.895 g/cc.

In some embodiments, the TPE component includes ethylene/α-olefin interpolymers and/or ethylene/α-olefin multi-block interpolymers. Suitable ethylene/α-olefin interpolymers may include the ENGAGE™ and AFFINITY™ elastomers and plastomers, available from The Dow Chemical Company (Midland, Mich.) and suitable ethylene/α-olefin multi-block interpolymers (OBCs) may include the INFUSE™ resins, available from The Dow Chemical Company, (Midland, Mich.).

Ethylene/Alpha-Olefin Interpolymer

The ethylene/α-olefin interpolymers are copolymers of ethylene with at least one C3-C20 α-olefin. Examples of suitable comonomers include C3-C20 α-olefins such as propylene, isobutylene, 1-butene, 1-hexene, 1-pentene, 4-methyl-1-pentene, 1-heptene, 1-octene, 1-nonene, 1-decene, and the like. In some embodiments, the comonomer is 1-Butene or 1-octene. The ethylene/α-olefin interpolymers have at greater than 50% based on the total amount of polymerizable monomers of ethylene.

The ethylene/α-olefin interpolymer may be a homogeneously branched linear or homogeneously branched substantially linear ethylene/α-olefin interpolymer. Processes for preparing homogeneous polymers are disclosed in U.S. Pat. Nos. 5,206,075; 5,241,031; and PCT International Application WO 93/03093; each of which is incorporated, herein, by reference in its entirety. Further details regarding the production of homogeneous ethylene α-olefin copolymers are disclosed in U.S. Pat. Nos. 5,206,075; 5,241,031; PCT International Publication Number WO 93/03093; PCT International Publication Number WO 90/03414; all four of which are herein incorporated, herein, in their entireties, by reference.

The terms "homogeneous" and "homogeneously-branched" are used in reference to an ethylene/α-olefin polymer (or interpolymer), in which the comonomer(s) is randomly distributed within a given polymer molecule, and substantially all of the polymer molecules have the same ethylene-to-comonomer(s) ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992.

Substantially linear ethylene interpolymers used in the present invention are described in U.S. Pat. Nos. 5,272,236 and 5,278,272; the entire contents of each are herein. As discussed above, the substantially linear ethylene interpolymers are those in which the comonomer is randomly distributed within a given interpolymer molecule, and in which substantially all of the interpolymer molecules have the same ethylene/comonomer ratio within that interpolymer. Substantially linear ethylene interpolymers are prepared using a constrained geometry catalyst. Examples of constrained geometry catalysts, and such preparations, are described in U.S. Pat. Nos. 5,272,236 and 5,278,272.

In addition, the substantially linear ethylene interpolymers are homogeneously branched ethylene polymers having long chain branching. The long chain branches have about the same comonomer distribution as the polymer backbone, and can have about the same length as the length of the polymer backbone. As discussed above, "substantially linear," typically, is in reference to a polymer that is substituted, on average, with 0.01 long chain branches per 1000 total carbons (including both backbone and branch carbons) to 3 long chain branches per 1000 total carbons. Commercial examples of substantially linear polymers include ENGAGE™ polymers (The Dow Chemical Company), and AFFINITY™ polymers (The Dow Chemical Company).

In certain embodiments, the ethylene/α-olefin interpolymers have a molecular weight distribution (Mw/Mn) from 1 to 5, from 1.5 to 4, or from 2 to 3. All individual values and subranges from 1 to 5 are included herein and disclosed herein.

In certain embodiments, the ethylene/α-olefin interpolymers have a density greater than, or equal to 0.850 g/cc, greater than, or equal to, 0.855 g/cc, or greater than, or equal to 0.860 g/cc in accordance with ASTM D792 or ISO 1183-187.

In certain embodiments, the ethylene/α-olefin interpolymers have a density less than, or equal to. 0.910 g/cc, less than, or equal to, 0.900 g/cc, or less than, or equal to, 0.880 g/cc in accordance with ASTM D792 or ISO 1183-187.

In certain embodiments, the ethylene/α-olefin interpolymers have a density from 0.850 to 0.910 g/cc, from 0.850 to 0.880 g/cc, or from 0.860 to 0.880 g/cc in accordance with ASTM D792 or ISO 1183-187. All individual values and subranges from 0.850 to 0.910 g/cc are included herein and disclosed herein.

In certain embodiments, the ethylene/α-olefin interpolymers have in accordance with ASTM D1238 or ISO 1133, a melt index, I2 (190° C./2.16 kg) greater than, or equal to, 0.05 g/10 min, greater than, or equal to, 0.1 g/10 min, or greater than, or equal to 0.2 g/10 min.

In certain embodiments, the ethylene/α-olefin interpolymer have, in accordance with ASTM D1238 or ISO 1133, a melt index, I2 (190° C./2.16 kg), less than or equal to 50 g/10 min, less than or equal to 25 g/10 min, less than or equal to 10 g/10 min, less than or equal to 5 g/10 min, and/or less than or equal to 2 g/10 min.

In certain embodiments, the ethylene/α-olefin interpolymers have in accordance with ASTM D1238 or ISO 1133, a melt index, I2 (190° C./2.16 kg) from 0.05 to 50 g/10 min, from 0.1 to 25 g/10 min, and/or from 0.2 to 10 g/10 min. All individual values and subranges from 0.05 to 50 g/10 min are included herein and disclosed herein.

In certain embodiments, the ethylene/α-olefin interpolymers have a number average molecular weight, (Mn) from 40,000 g/mole to 200,000 g/mole, from 50,000 g/mole to 150,000 g/mole, or from 60,000 g/mole to 100,000 g/mole. All individual values and subranges from 40,000 g/mole to 200,000 g/mole are included herein and disclosed herein.

In certain embodiments, the ethylene/α-olefin interpolymers have a weight average molecular weight, (Mw) from 80,000 g/mole to 400,000 g/mole, from 100,000 g/mole to 300,000 g/mole, or from 120,000 g/mole to 200,000 g/mole. All individual values and subranges from 80,000 g/mole to 400,000 g/mole are included herein and disclosed herein.

In certain embodiments, the ethylene/α-olefin interpolymers have a Tg less than −30° C., less than −40° C., and or less than −50° C.

The ethylene/α-olefin interpolymers of the present disclosure may be produced by any process or means known by one of ordinary skill in the art.

In certain embodiments, the TPE component may comprise more than one ethylene/α-olefin block interpolymer or ethylene/α-olefin multi block interpolymer as described herein.

In certain embodiments, the thermoplastic polyolefin elastomer component includes an ethylene/α-olefin multi block interpolymer, as described below.

Ethylene/Alpha-Olefin Multi Block Interpolymer

In certain embodiments, the at least one thermoplastic polyolefin elastomer is an ethylene/alpha-olefin multi-block interpolymer. The term "olefin block copolymer" or "OBC" means (and is interchangeable with) an "ethylene/α-olefin multi-block interpolymer" and includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the interpolymer, it is understood that this means polymerized units thereof. In some embodiments, the ethylene/α-olefin interpolymer is an ethylene/α-olefin multi-block interpolymer. In some embodiments, the ethylene/α-olefin multi-block copolymer can be represented by the following formula:

(AB)$_n$, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB.

Ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the ethylene content is greater than 80 mole percent of the whole polymer and the octene content is from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer may have a polydispersity index (Mw/Mn) from 1.7 to 3.5, or from 1.8 to 3, or from 1.8 to 2.8, or from 2.4 to 2.8.

In a further embodiment, the ethylene/α-olefin multi-block copolymer is defined as having:
(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \leq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G' (25° C.), and a storage modulus at 100° C., G' (100° C.), wherein the ratio of G' (25° C.) to G' (100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

It is understood that the ethylene/α-olefin multi-block interpolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793. Further exemplary catalytic processes include those disclosed in U.S. Pat. No. 8,785,554, which is herein incorporated by reference.

In certain embodiments, the ethylene/α-olefin multi-block interpolymer has a density greater than 0.850 g/cc, further greater than 0.860 g/cc, and further greater than 0.865 g/cc. The density may be, for example, from 0.850 g/cc to 0.910 g/cc, from 0.860 g/cc to 0.905 g/cc, and from 0.860 to 0.900 g/cc. Density is measured by the procedure of ASTM D-792 or ISO 1183.

In certain embodiments, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In certain embodiments, the ethylene/α-olefin multi-block interpolymer, and further copolymer, has a melt index (I2) greater than, or equal to, 0.1 g/10 min, and further greater than, or equal to, 0.5 g/10 min, and less than, or equal to, 50 g/10 min, further less than, or equal to, 20 g/10 min, and further less than, or equal to, 10 g/10 min, as determined using ASTM D-1238 or ISO 1133 (190° C., 2.16 kg load).

Blend

In embodiments herein, the blend has a high load melt index (I21) from 0.1 to 40 g/10 min. All individual values and subranges from 0.1 to 40 g/10 min are included and disclosed herein. For example, in some embodiments, the blend has a high load melt index (I21) from 0.1 to 20 g/10 min. In other embodiments, the blend has a high load melt index (I21) from 0.3 to 18 g/10 min. In further embodiments, the blend has a high load melt index (I21) from 0.5 to 15 g/10 min.

In addition to the high load melt index, the blend may further have a density in the range of 0.890-0.930 g/cc (or 0.890-0.926 g/cc), a weight average molecular weight, Mw, of from 250,000 to 2,000,000 g/mole (or 400,000 to 1,600,000 g/mole), a molecular weight distribution (ratio of weight average molecular weight to number average molecular weight, Mw/Mn) of 7 to 40 (or 10 to 30), and/or a Eta$^{0.1}$ of 75,000 to 3,500,000 Pa-sec (or 100,000-3,000,000 Pa-sec).

In embodiments herein, the blends may exhibit a % mass loss as measured according to the sand slurry test of less than 3.5%.

The blend described herein may contain one or more optional additives. Additives include, but are not limited to, processing aids, acid neutralizers, UV stabilizers, hydroperoxide decomposers, alkyl radical scavengers, hindered amine stabilizers, multifunctional stabilizers, phosphites, antioxidants, process stabilizers, metal de-activators, additives to improve oxidative or chlorine resistance, pigments or colorants, nucleating agents, fatty acid stearates, fluoroelastomers, fillers, or combinations thereof.

In some embodiments herein, the blends may contain one or more processing aids. In some embodiments, the processing aid may comprise one or more fluoropolymers. Without being bound by theory, it is believed that the inclusion of one or more fluoropolymers in the blends described herein improves processability of the blend, by lowering the apparent melt viscosity of the blend to reduce build up at an extrusion die. Additionally, the inclusion of one or more fluoropolymers in the blends described herein does not adversely affect the mechanical properties of the blends. Suitable fluoropolymers may include, but are not limited to, vinylidene fluoride, hexafluoropropylene, chlorotrifluoroethylene, tetrafluoroethylene, perfluoroalkyl perfluorovinyl ethers, 1-hydropentafluoropropylene, 2-hydropentafluoropropylene, or combinations thereof. Other examples of suitable fluoropolymers may include, but are not limited to, copolymers of vinylidene fluoride and one or more comonomers selected from hexafluoropropylene, chlorotrifluoroethylene, 1-hydropentafluoropropylene, and 2-hydropentafluoropropylene. Further examples of suitable fluoropolymers may include, but are not limited to, copolymers of tetrafluoroethylene and one or more comonomers selected from hexafluoropropylene and vinylidene fluoride. In some examples, the fluoropolymers may further be blended with olefins, such as, for example, propylene, or a polyether, such as, for example, polyethylene oxide. In some embodiments, the fluoropolymer is selected from the group consisting of vinylidene fluoride/hexafluoropropylene, vinylidene fluoride/hexafluoropropylene/tetrafluoroethylene, tetrafluoroethylene, tetrafluoroethylene/propylene, tetrafluoroethylene/propylene/vinylidene fluoride, or vinylidene fluoride/hexafluoropropylene/polyethylene oxide. In other embodiments, the fluoropolymer is selected from the group consisting of vinylidene fluoride/hexafluoropropylene, vinylidene fluoride/hexafluoropropylene/tetrafluoroethylene, tetrafluoroethylene/propylene/vinylidene fluoride, or vinylidene fluoride/hexafluoropropylene/polyethylene oxide. In further embodiments, the fluoropolymer is vinylidene fluoride/hexafluoropropylene/tetrafluoroethylene.

The fluoropolymers described herein may also be characterized by one or more properties. In some embodiments, the fluoropolymers employed in the blends described herein may have a melting point of 100 to 135° C., as measured by the differential scanning calorimetry (DSC) according to ASTM D 4591-07. In some embodiments, the fluoropolymers employed in the blends described herein may have a density of 1.80 to 2.20 g/cc. The density may be determined according to ASTM D 792. In some embodiments, the fluoropolymers employed in the blends described herein may have a melt flow index (265° C.; 5 kg) of 2.0 to 20.0 g/10 min. The melt flow index (MFI) may be determined according to ASTM D 1238 at 265° C., 5.0 kg. The one or more fluoropolymers may be employed in the blends such that the total fluoropolymer level is from 50 to 5000 ppm, from 100 to 3000, from 150 to 2000, or from 250 to 1000 ppm. Without being bound by theory, it is believed that incorporation of one or more fluoropolymers into the blends described herein can contribute to more homogenized blends during compounding and also to better abrasion resistant properties by reducing the coefficient of friction at the surface of the blends described herein.

Test Methods

Unless otherwise stated, the following test methods are used.

Density

Density for ethylene-based polymers is determined according to ASTM D 792.

Melt Index

Melt index, or I2, is determined according to ASTM D 1238 at 190° C., 2.16 kg. High load melt index, or I21, is determined according to ASTM D 1238 at 190° C., 21.6 kg.

Gel Permeation Chromatography

The chromatographic system consisted of a PolymerChar GPC-IR (Valencia, Spain) high temperature GPC chromatograph equipped with a 4-capillary differential viscometer detector and a IR5 multi-fixed wavelength infra-red detector. A Precision Detectors (Agilent) 2-angle laser light scattering detector Model 2040 was added to the system. The 15-degree angle of the light scattering detector was used for calculation purposes. Data collection was performed using "GPC One" software from PolymerChar. The system was equipped with an on-line solvent degas device from Agilent.

Both the carousel compartment and the column compartment were operated at 150° C. The columns used were 4 Agilent "Mixed A" 30 cm 20-micron columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

For conventional molecular weight measurements, the GPC column set was calibrated with at least 20 narrow molecular weight distribution polystyrene standards (Agilent) with molecular weights ranging from 580 to 8,400,000 and were arranged in 6 "cocktail" mixtures with at least a decade of separation between individual molecular weight components. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using the following equation (as described in *Williams and Ward, J. Polym. Sci., Polym. Let.*, 6, 621 (1968)):

$$M_{polyethylene} = A \times (M_{polystyrene})^B$$

where M is the molecular weight, A has a value of approximately 0.41 for conventional GPC and triple detector backbone MW calculations (referencing an A value that yields an Mw of 52,000 for SRM NBS1475) and B is equal to 1.0. A third-order polynomial was used to fit the respective polyethylene-equivalent calibration points. Data calculations were performed using "GPC One" software from PolymerChar.

Dynamic Mechanical Spectroscopy (DMS)

Resins are compression-molded into "25×3 mm" circular plaques at 190° C., for six and a half minutes, under 20,000 lbs., in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 rad/s. The strain amplitude is constant at 10%. The viscosity at 0.1 rad/s ($Eta^{0.1}$) may be calculated from this data and is reported in Pa-sec.

Abrasion Resistance Test (Sand Slurry Test)

A Sand Slurry Test Rig, similar to that described in ISO-15527, was used for abrasion resistance test. The test rig was 11 inches deep by 9 inches in internal diameter. The test rig contained 10.2 kilograms of 16 grit aluminum oxide (Alox 16) and 6.2 kilograms of water, which filled the bottom 8 inches of the vessel. A 6 in L×6 in W×10 mm thick compression molded plaque is cut into test coupons with dimension of 3.875 inch L×1.25 inch W×10 mm thick. A test coupon was attached to the bottom of a 10 inch long drive shaft that rotated the test coupon 2 inches above the bottom of the test rig at about 1,500 rpm. A minimum of 3 samples each were tested for 90 mins at room temperature at 1,500 rpm. The test produced significant, but reproducible mass loss on the test coupons. For each test, fresh grit and water were used. The weight of each test coupon was measured before and after the abrasion test. The following calculations were made: Weight Loss for Each Test Coupon, g=[Before Abrasion Weight, g]−[After Abrasion Weight, g]; Average Weight Loss=[ΣWeight Loss for Each Test Coupon, g]/[Number of Measurements]; % Weight Loss for Each Test Coupon=[Weight Loss for Each Test Coupon (g)/Before Abrasion Weight (g)]×100%; Average % Weight Loss=[Σ%

Weight Loss]/[Number of Measurements]. The endpoints of the Range of Loss were selected from the lowest and highest Weight Loss values.

EXAMPLES

The following compositions are used in the Examples described below.

Inventive Example 1

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (INFUSE™ 9010, an ethylene/alpha-olefin multi-block interpolymer, density=0.877 g/cc, melt index $I_2$=0.5 g/10 min, Mw/Mn of 2.6, available from The Dow Chemical Company, USA) were blended at a 50:15:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"× 1.25" test coupons for abrasion testing. The details of the compression molding procedure are described in ASTM D4703.

Inventive Example 2

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (ENGAGE™ 7387, ethylene/alpha-olefin interpolymer, density=0.870 g/cc, melt index $I_2$=0.5 g/10 min, available from The Dow Chemical Company, USA) were blended at a 50:15:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"× 1.25" test coupons for abrasion testing. The details of the compression molding procedure are described in ASTM D4703.

Inventive Example 3

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (INFUSE™ 9010, an ethylene/alpha-olefin multi-block interpolymer, density=0.877 g/cc, melt index $I_2$=0.5 g/10 min, available from The Dow Chemical Company, USA) were blended at a 50:30:20 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"× 1.25" test coupons for abrasion testing. The details of the compression molding procedure are described in ASTM D4703.

Inventive Example 4

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (INFUSE™ 9010, an ethylene/alpha-olefin multi-block interpolymer, density=0.877 g/cc, melt index $I_2$=0.5 g/10 min, available from The Dow Chemical Company, USA) were blended at a 35:30:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw compounder, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D 4703.

Inventive Example 5

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA), and a thermoplastic polyolefin elastomer (ENGAGE™ 7280, ethylene/alpha-olefin interpolymer, density=0.884 g/cc, melt index $I_2$=0.5 g/10 min, available from The Dow Chemical Company, USA) were blended at a 50:15:35 weight ratio to form a composition. The composition was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The properties of the composition (pellets) are shown below in Table 1. The composition was compression molded into 6"×6" plaques (10 mm thick), and then cut into 3.875"×1.25" test coupons for abrasion testing. The details of the compression molding procedure are described in ASTM D 4703.

TABLE 1

Composition Properties

| | Density (g/cc) | Mw (g/mole) | MWD (or Mw/Mn) | Eta$^{0.1}$ (Pa-sec) |
|---|---|---|---|---|
| Inventive Example 1 | 0.9151 | — | — | 582,982 |
| Inventive Example 2 | 0.9107 | 774,807 | 12.13 | — |
| Inventive Example 3 | 0.9246 | 1,418,392 | 29.23 | 892,555 |
| Inventive Example 4 | 0.9171 | 822,595 | 18.76 | 192,021 |
| Inventive Example 5 | 0.9172 | 853,062 | 15.53 | — |

Comparative Examples

Comparative Example 1

A polyethylene resin comprising a first molecular weight ethylene-based polymer component and a second molecular weight ethylene-based polymer component having a melt index, $I_2$, of 0.07 g/10 min, and a density of 0.949 g/cc (DGDA 2490 NT, available from the Dow Chemical Company, USA). The polyethylene resin was compression molded per ASTM D 4703 into 6"×6" plaques (10 mm thick) and then cut into 3.875"×1.25" test coupons for abrasion testing.

Comparative Example 2

An ultra-high molecular weight polyethylene having a weight average molecular weight of 8,000,000, a density of 0.925 g/cc, and an intrinsic viscosity of 28 dL/g (UTEC™ 6541, available from Braskem, Brazil). The ultra-high molecular weight polyethylene was compression molded per ASTM D 4703 into 6"×6" plaques (10 mm thick) and then cut into 3.875"×1.25" test coupons.

Comparative Example 3

A polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA). The polyethylene resin was compression molded per ASTM D 4703 into 6"×6" plaques (10 mm thick) and then cut into 3.875"×1.25" test coupons for abrasion testing.

Comparative Example 4

An ultra-high molecular weight ethylene-based polymer having a weight average molecular weight of 8,000,000 g/mole, a density of 0.925 g/cc, an intrinsic viscosity of 28 dL/g, and an average particle size, D50, of 150 μm (UTEC™ 6541, available from Braskem, Brazil), a polyethylene resin comprising a first molecular weight ethylene-based polymer component and a second molecular weight ethylene-based polymer component (DGDA-2420 NT, density=0.940 g/cc, high load melt index $I_{21}$=9.5 g/10 min, a melt index, $I_2$, of 0.15 g/10 min, and a Mw/Mn of 9, available from the Dow Chemical Company, USA) were blended at a 60:40 weight ratio to form a blend. The blend was compounded with 600 ppm of a fluoropolymer process aid that has a melt flow index (265° C., 5 Kg) of 10 g/10 minutes (Dynamar FX5911, available from 3M, Inc., USA), using a LabTech 26 mm twin screw, at the following processing parameters to produce uniform pellets:

Barrel Temperatures: 275° C. flat temperature profile
Die Temperatures: 280° C. flat temperature profile
Screw RPM: 130; Torque: 80%; Melt Temperature: 280° C.

The composition was compression molded into 6"×6" plaques (10 mm thick), and then cut into 3.875"×1.25" test coupons for abrasion testing. The details of the compression molding procedure are described in ASTM D 4703.

TABLE 2

Abrasion Resistance & HLMI (or $I_{21}$) Test Results

| Material | HLMI or $I_{21}$ (g/10 minutes) | Loss Properties @ Room Temperature in Water Average Weight Loss (%) |
|---|---|---|
| Inventive Example 1 | 6.50 | 1.61% |
| Inventive Example 2 | 6.50 | 1.26% |
| Inventive Example 3 | 3.93 | 2.47% |

TABLE 2-continued

Abrasion Resistance & HLMI (or I$_{21}$) Test Results

| Material | HLMI or I$_{21}$ (g/10 minutes) | Loss Properties @ Room Temperature in Water Average Weight Loss (%) |
|---|---|---|
| Inventive Example 4 | 14.83 | 1.88% |
| Inventive Example 5 | 6.50 | 1.83% |
| Comparative Example 1 | 7.0 | 7.04% |
| Comparative Example 2 | 0.0 | 2.31% |
| Comparative Example 3 | 9.5 | 5.24% |
| Comparative Example 4 | 0.08 | 3.30% |

As shown in Table 2, the Inventive Examples exhibit a higher abrasion resistance (i.e., a lower average weight loss %) when compared to Comparative Examples 1 and 3, which are polyethylene resins alone, and in comparison to Comparative Example 4. The Inventive Examples also either perform better or do not lose a significant amount of abrasion resistance when compared to Comparative Example 2. In addition, the HLMI for the Inventive Examples, when compared to that of both Comparative Examples 2 and 4, respectively, show improved processability due to the higher HLMI value.

Prophetic Examples

TABLE 3

Flexible Multilayer Pipe Liner

| Example # | Fibrous Layer | Resin/Resin Dispersion | Polyolefin Backing Layer |
|---|---|---|---|
| Prophetic Example A | Felt | Epoxy, MaxPox™ 15/180, available from RS Technik AG | Blend of: 50 wt. % of UTEC™ 6541; 15 wt. % of DGDA-2420 NT; 35 wt. % of ENGAGE™ 7387; 600 ppm of Dynamar FX5911 added to the blend. |
| Prophetic Example B | Felt | Epoxy, MaxPox™ 15/180, available from RS Technik AG | Blend of: 50 wt. % of UTEC™ 6541; 15 wt. % of DGDA-2420 NT; 35 wt. % of INFUSE™ 9010; 600 ppm of Dynamar FX5911 added to the blend. |
| Prophetic Example C | Felt | 42 wt. % of DGDA-2420 NT base resin: 20 wt. % of PRIMACOR™ 5980i dispersing agent, available from The Dow Chemical Company; 5 wt.% of Licocene™ PE MA 4351 modifying polymer; available from Clariant International Ltd.; and 33 wt. % of water. | Blend of: 50 wt. % of UTEC™ 6541; 15 wt. % of DGDA-2420 NT; 35 wt. % of ENGAGE™ 7387; 600 ppm of Dynamar FX5911 added to the blend. |
| Prophetic Example D | Felt | 42 wt. % of DGDA-2420 NT base resin: 5980i dispersing agent, 5 wt. % of Licocene™ PE MA 4351 modifying polymer; and 33 wt. % of water. | Blemd of: 50 wt. % of UTEC™ 6541; 15 wt. % of DGDA-2420 NT; 35 wt. % of INFUSE™ 9010; 600 ppm of Dynamar FX5911 added to the blend. |
| Prohetic Example E | Felt | 59 wt. % of 6D43 Polypropylene base resin, available from Braskem America, Inc.; 19 wt. % of PRIMACOR™ 5980i dispersing agent; 6 wt.% of Licocene™ PE MA 4351 modifying polymer; and 16 wt. % of water. | Blend of: 50 wt. % of UTEC™ 6541; 15 wt. % of DGDA-2420 NT; 35 wt. % of ENGAGE™ 7387; 600 ppm of Dynamar FX5911 added to the blend. |
| Prophetic Example F | Felt | 59 wt. % of 6D43 Polypropylene base resin; 19 wt. % of PRIMACOR™ 5980i dispersing agent; 6 wt. % of Licocene™ PE MA 4351 modifying polymer; and 16 wt. % of water. | Blend of: 50 wt. % of UTEC™ 6541; 15 wt. % of DGDA-2420 NT; 35 wt. % of INFUSE™ 9010; 600 ppm Dynamar FX5911 aaded to the blend. |
| Prophetic Example G | Felt | 57 wt. % of HDPE DMDA 8940 base resin, available from The Dow Chemical Company; 18 wt. % of PRIMACOR™ 5980i dispersing agent; 6 wt .% of Licocene™ PE MA 4351 modifying polymer; and 19 wt. % of water. | Blend of: 50 wt. % of UTEC™ 6541; 15 wt. % of DGDA-2420 NT; 35 wt. % of ENGAGE™ 7387; 600 ppm Dynamar FX5911 added to the blend. |

TABLE 3-continued

Flexible Multilayer Pipe Liner

| Example # | Fibrous Layer | Resin/Resin Dispersion | Polyolefin Backing Layer |
|---|---|---|---|
| Prophetic Example H | Felt | 57 wt. % of HDPE DMDA 8940 base resin; 18 wt. % of PRIMACOR™ 5980i dispersing agent; 6 wt. % of Licocene™ PE MA 4351 modifying polymer; and 19 wt. % of water. | Blend of: 50 wt. % of UTEC™ 6541; 15 wt. % of DGDA-2420 NT; 35 wt. % of INFUSE™ 9010; 600 ppm of Dynamar FX5911 added to the blend. |

The invention claimed is:

1. A flexible multilayer pipe liner comprising:
a fibrous layer saturated with a resin or resin dispersion; and
a polyolefin backing layer comprising a blend of:
(a) from 30 to 60 wt. % of an ultra-high molecular weight ethylene-based polymer having an intrinsic viscosity from 5 to 50 deciliters/gram,
(b) from 10 to 40 wt. % of a polyethylene resin comprising a first molecular weight ethylene-based polymer component and a second molecular weight ethylene-based polymer component, wherein the polyethylene resin has a density from 0.930 to 0.960 g/cc;
(c) from 10 to 40 wt. % of a thermoplastic polyolefin elastomer having a density of from 0.850 to 0.910 g/cc; and
(d) optionally, a fluoropolymer;
wherein the amounts of ultra-high molecular weight ethylene-based polymer, polyethylene resin, and thermoplastic polyolefin elastomer add up to 100 wt. %, and wherein the blend exhibits an abrasion resistance, as measured according to the Sand Slurry Test, of less than 2.75%.

2. The flexible multilayer pipe liner of claim 1, wherein the ultra-high molecular weight ethylene-based polymer has a weight average molecular weight of greater than 1,000,000 g/mole.

3. The flexible multilayer pipe liner of claim 1, wherein the polyethylene resin has a melt index (2) from 0.03-2.0 g/10 min.

4. The flexible multilayer pipe liner of claim 1, wherein the polyethylene resin has a high load melt index (I21) from 1 to 20 g/10 min.

5. The flexible multilayer pipe liner of claim 1, wherein the first molecular weight ethylene-based polymer component has a high load melt index (I21) of from 0.05 to 1.2 g/10 min.

6. The flexible multilayer pipe liner of claim 1, wherein the blend has a high load melt index (I21) from 0.1 to 40 g/10 min.

7. The flexible multilayer pipe liner of claim 1, wherein the thermoplastic polyolefin elastomer is selected from the group consisting of ethylene/alpha-olefin interpolymers, ethylene/alpha-olefin multi-block interpolymers, and combinations thereof.

8. The flexible multilayer pipe liner of claim 1, wherein the blend further comprises a fluoropolymer that has a melt flow index (265° C.; 5.0 kg) from 2.0 to 20.0 g/10 min.

9. The flexible multilayer pipe liner of claim 1, wherein the blend further comprises a fluoropolymer that is present in an amount from 50 to 5000 ppm, based on the weight of the blend.

10. The flexible multilayer pipe liner of claim 1, wherein the resin is a polyester, vinyl ester, epoxy, carbamide, or combinations thereof.

11. The flexible multilayer pipe liner of claim 1, wherein the resin dispersion is an aqueous polyolefin dispersion comprising:
(a) a base resin comprising at least one $C_2$-$C_3$ polyolefin having a melting point of at least 110° C.; and
(b) a dispersing agent comprising at least one polymer having ethylene and carboxylic acid, a modifying polymer comprising at least one maleated $C_2$-$C_3$ polyolefin wax, or combinations thereof.

12. A flexible composite comprising:
a fibrous layer; and
a polyolefin backing layer comprising a blend of:
(a) from 30 to 60 wt. % of an ultra-high molecular weight ethylene-based polymer having an intrinsic viscosity from 5 to 50 deciliters/gram,
(b) from 10 to 40 wt. % of a polyethylene resin comprising a first molecular weight ethylene-based polymer component and a second molecular weight ethylene-based polymer component, wherein the polyethylene resin has a density from 0.930 to 0.960 g/cc;
(c) from 10 to 40 wt. % of a thermoplastic polyolefin elastomer having a density of from 0.850 to 0.910 g/cc; and
(d) optionally, a fluoropolymer;
wherein the amounts of ultra-high molecular weight ethylene-based polymer, polyethylene resin, and thermoplastic polyolefin elastomer add up to 100 wt. %, and wherein the blend exhibits an abrasion resistance, as measured according to the Sand Slurry Test, of less than 2.75%.

13. The flexible composite of claim 12, wherein the ultra-high molecular weight ethylene-based polymer has a weight average molecular weight of greater than 1,000,000 g/mole.

14. The flexible composite of claim 12, wherein the polyethylene resin has a melt index (2) from 0.03-2.0 g/10 min.

15. The flexible composite of claim 12, wherein the polyethylene resin has a high load melt index (I21) from 1 to 20 g/10 min.

16. The flexible composite of claim 12, wherein the first molecular weight ethylene-based polymer component has a density of from 0.910 to 0.940 g/cc.

17. The flexible composite of claim 12, wherein the first molecular weight ethylene-based polymer component has a high load melt index (I21) of from 0.05 to 1.2 g/10 min.

18. The flexible composite of claim 12, wherein the blend has a high load melt index (I21) from 0.1 to 40 g/10 min.

19. The flexible composite of claim 12, wherein the thermoplastic polyolefin elastomer is selected from the group consisting of ethylene/alpha-olefin interpolymers, ethylene/alpha-olefin multi-block interpolymers, and combinations thereof.

20. The flexible composite of claim 12, wherein the blend further comprises a fluoropolymer that has a melt flow index (265° C.; 5.0 kg) from 2.0 to 20.0 g/10 min.

* * * * *